Jan. 7, 1947.  R. G. ALLEN  2,413,902
CAM ADJUSTING AND INDICATING MECHANISM
Filed March 27, 1943  6 Sheets-Sheet 1

Inventor
R. G. Allen
By Rule and Hoge,
Attorneys

Jan. 7, 1947. R. G. ALLEN 2,413,902
CAM ADJUSTING AND INDICATING MECHANISM
Filed March 27, 1943 6 Sheets-Sheet 2

Inventor
R. G. Allen
By Rule & Hoge,
Attorneys

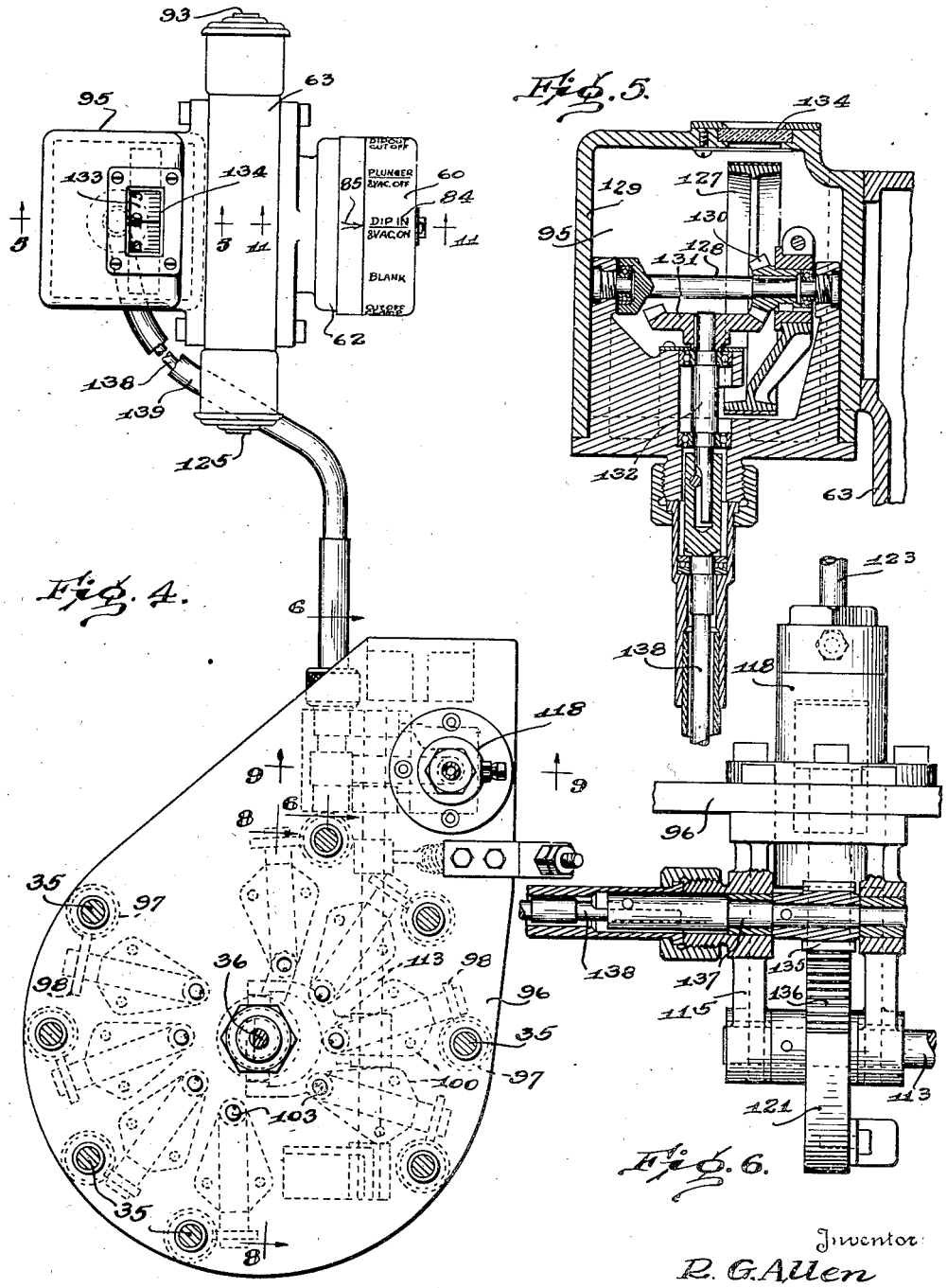

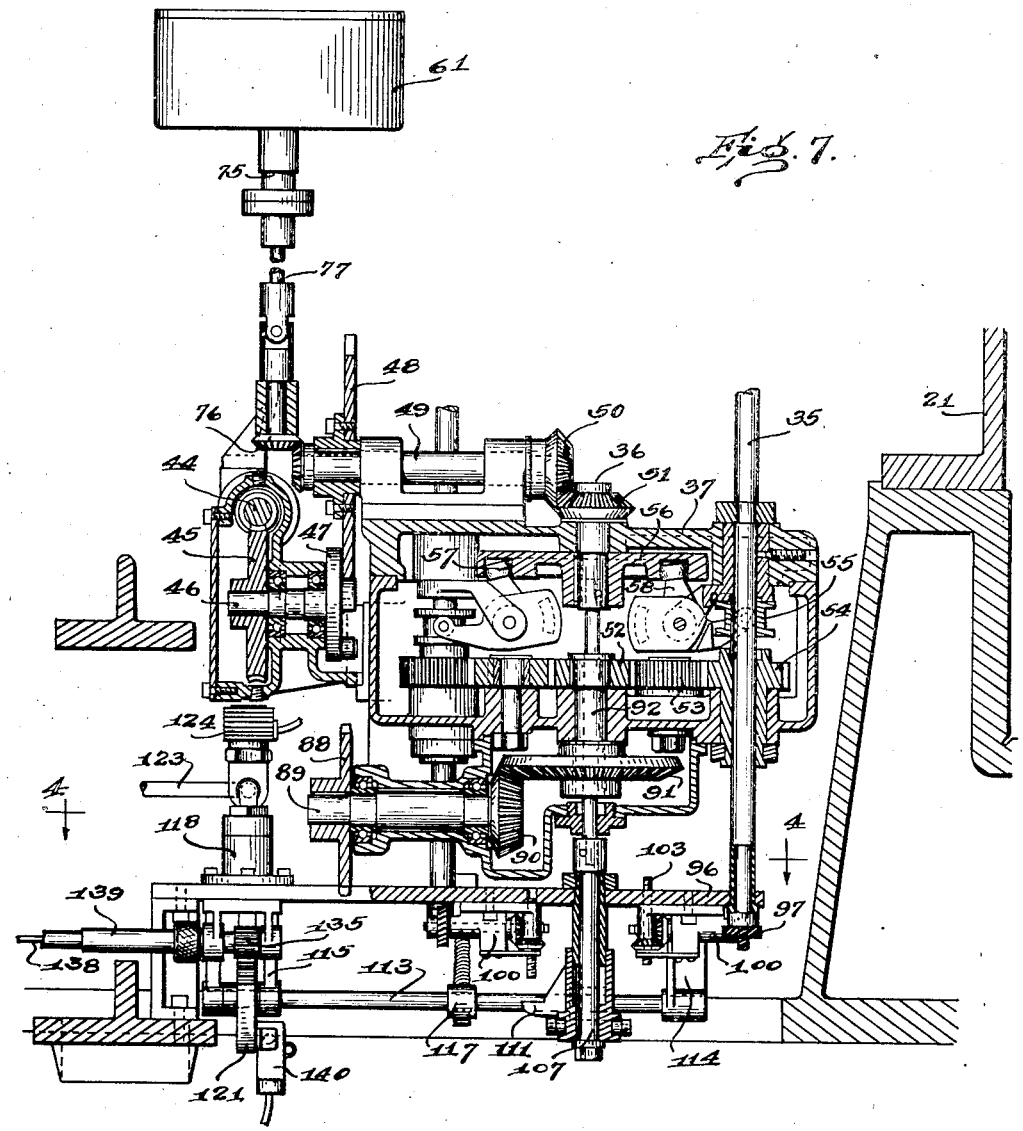

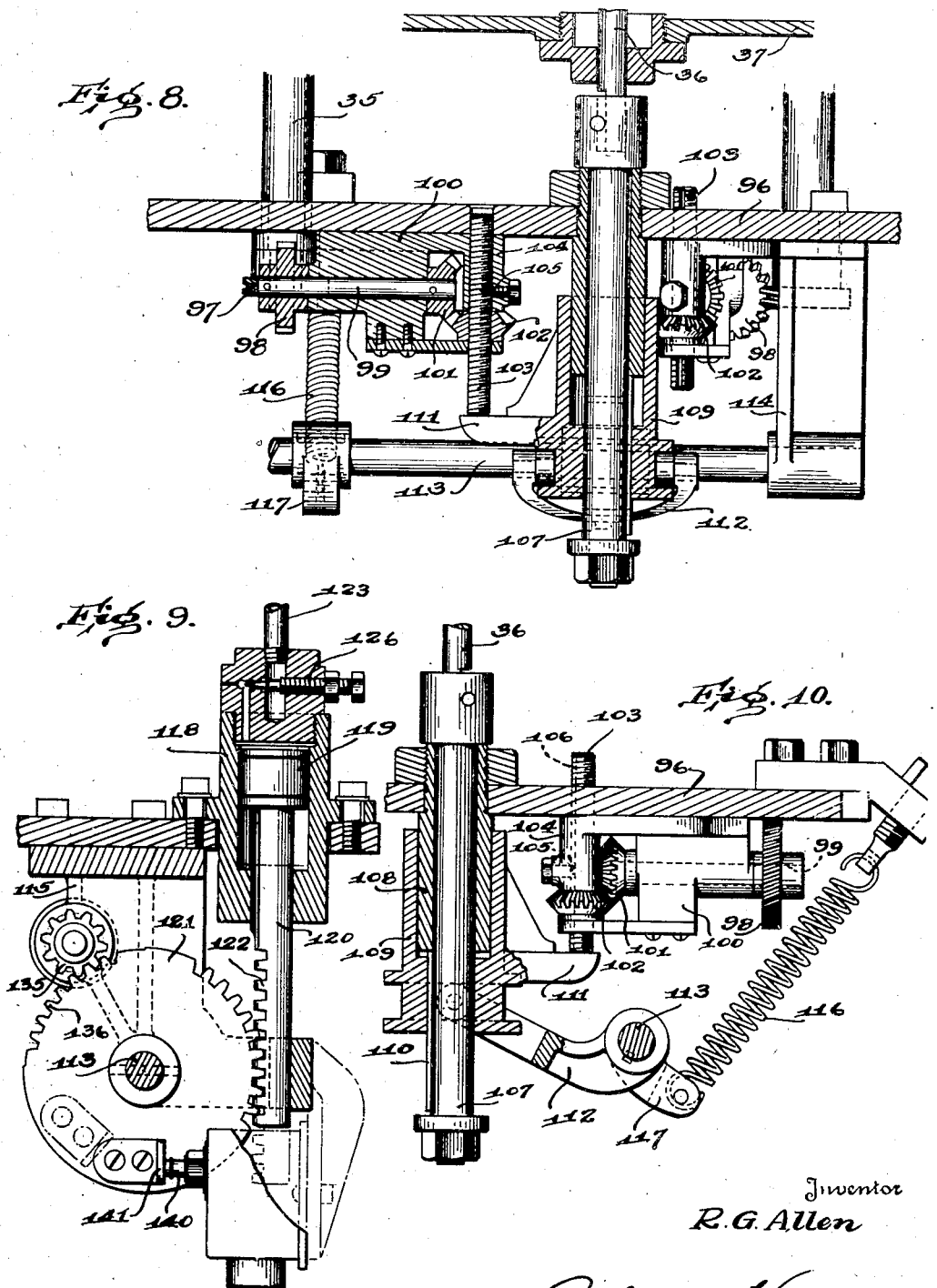

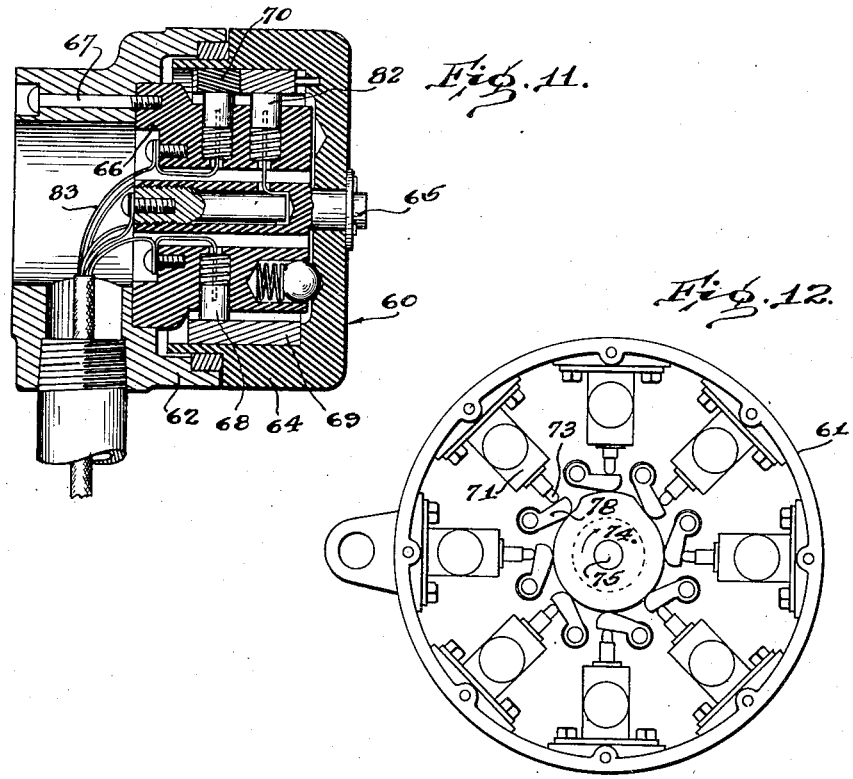
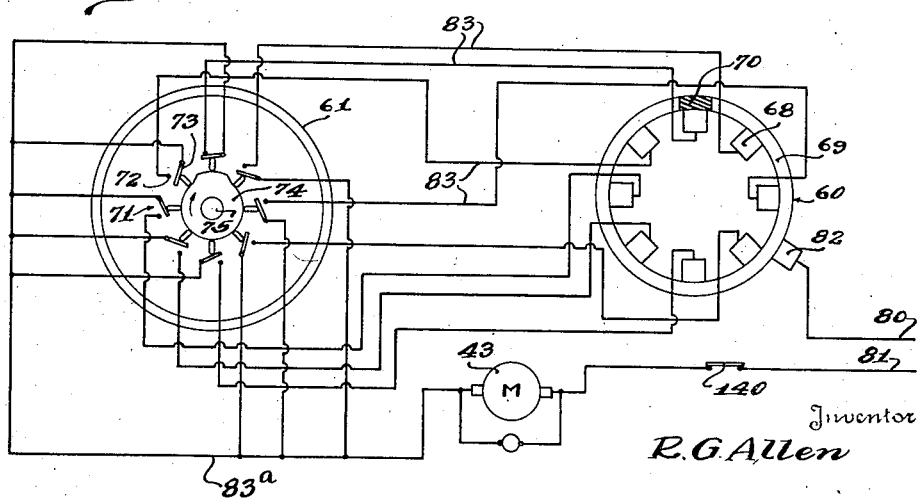

Patented Jan. 7, 1947

2,413,902

UNITED STATES PATENT OFFICE 2,413,902

CAM ADJUSTING AND INDICATING MECHANISM

Russell G. Allen, Alton, Ill., assignor to Owens-Illinois Glass Company, a corporation of Ohio Application March 27, 1943, Serial No. 480,775

10 Claims. (Cl. 192—142)

My invention relates to apparatus for selecting cams or other control devices, adjusting or moving said devices from one position to another, and indicating the extent of such movement or positions of adjustment.

The invention in the form herein illustrated, is particularly adapted for use with an Owens' type machine for blowing hollow glass articles, and is shown as combined with and forming a part of such a machine. In a machine of this type, charges of glass are drawn by suction into parison molds and the parisons formed therein are transferred to finishing molds in which they are blown to the form of finished articles. A machine of this type comprises stationary cams mounted on the center column of the machine and controlling various operations of the molds and other parts of the machine. The cams are individually adjustable for adjustably varying or timing the different operations. A machine of the above type is disclosed in United States Patent Number 2,269,391, granted in my name January 6, 1942, Machine for molding glass articles, which patent also discloses certain features of the cam selecting and adjusting mechanism shown in the present application.

An object of my invention is to provide a novel indicating device in combination with the cam selecting and adjusting mechanism, to indicate the position to which a selected cam has been adjusted.

A further object of the invention is to provide an indicating mechanism which may be mounted separately from the glass blowing machine, either on the machine base or in any other desired position more or less remote from the machine, for indicating the extent or position of adjustment of any selected cam.

Other objects of the invention will appear hereinafter.

Referring to the accompanying drawings:

Fig. 4 is a sectional plan view, substantially at the line 4—4 on Fig. 7, showing the series of cam adjusting spindles, the cam selector, and the indicator.

Fig. 5 is a sectional elevation of the indicator, the section being at the line 5—5 on Fig. 4.

Fig. 6 is a section at the line 6—6 on Fig. 4.

Fig. 7 is a sectional elevation at the line 7—7 on Fig. 2.

Fig. 8 is a section at the line 8—8 on Fig. 4.

Fig. 9 is a sectional elevation at the line 9—9 on Fig. 4.

Fig. 10 is a sectional elevation of mechanism shown on Fig. 8, viewed in a direction at right angles to that of Fig. 8.

Fig. 11 is a sectional elevation of the cam selector, at the line 11—11 on Fig. 4.

Fig. 12 is a diagrammatic plan view of the distributor with the cover of the casing removed.

Fig. 13 is a wiring diagram of the selector system, including the selector and distributor.

Figure 1:
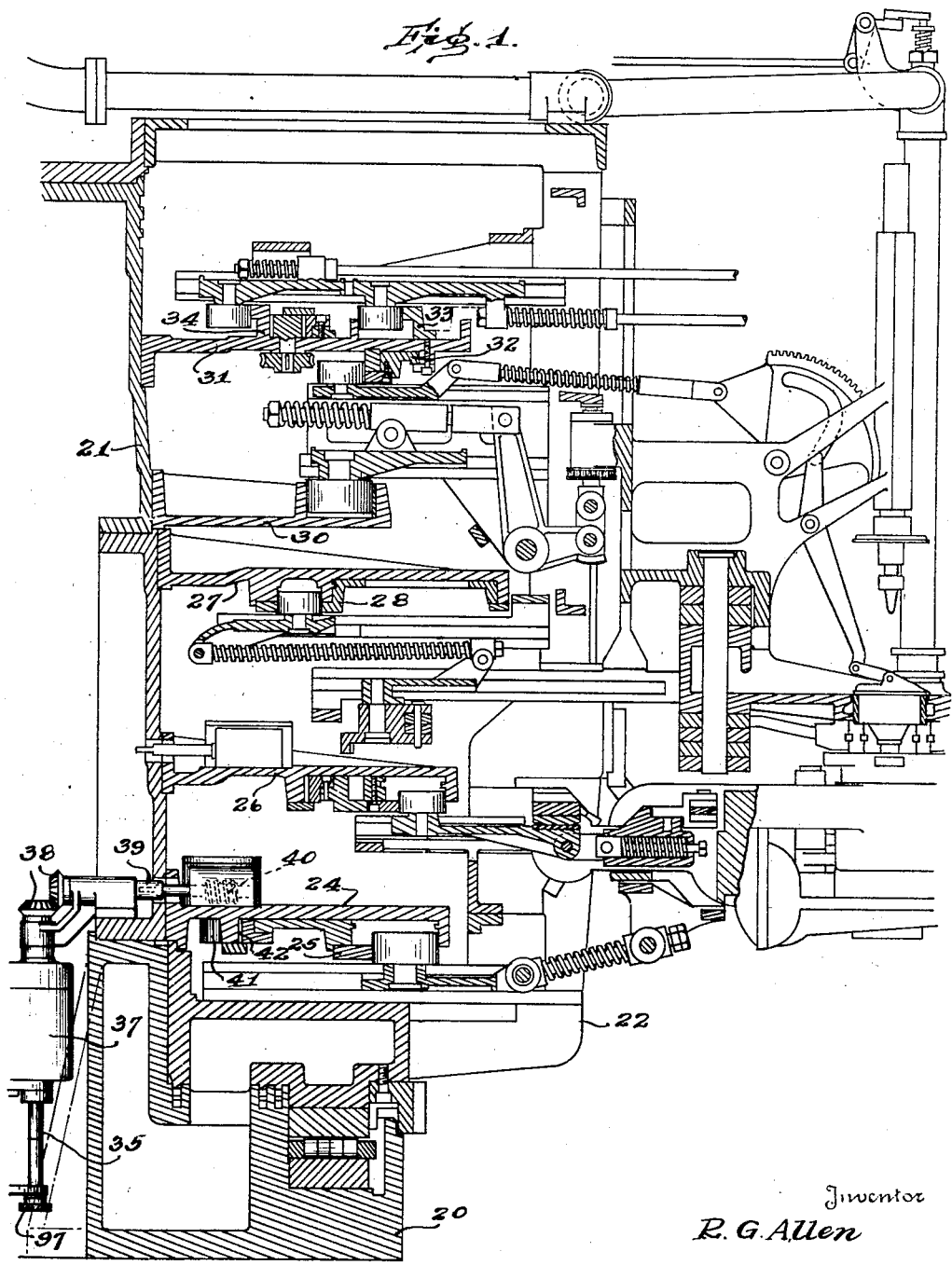
Fig. 1 is a sectional elevation of one unit of an Owens' type glass blowing machine to which the present invention is applied.

Referring to Fig. 1, the glass blowing machine comprises a base 20 on which is mounted a stationary center column 21. A mold carriage 22 is mounted to rotate continuously about the column. Stationary cam plates mounted on and surrounding the center column, include a cam plate 24 on which is mounted an adjustable cam 25 controlling the lifting and lowering movements of the finishing mold carrier, a cam plate 26 on which are mounted adjustable cams controlling the opening and closing movements of the finishing mold, a cam plate 27 on which is mounted an adjustable blank mold opening cam 28, a cam plate 30 controlling the lifting and lowering of the diphead, a cam plate 31 on the underside of which is mounted a cam 32 for lifting and lowering the plunger, and on the upper side of which are mounted cams 33 and 34 controlling respectively the knife swing and the knife drop. Reference may be had to the above mentioned Patent Number 2,269,391 for a description of the mechanisms through which the cams operate the various parts controlled thereby.

Figures 2, 3:
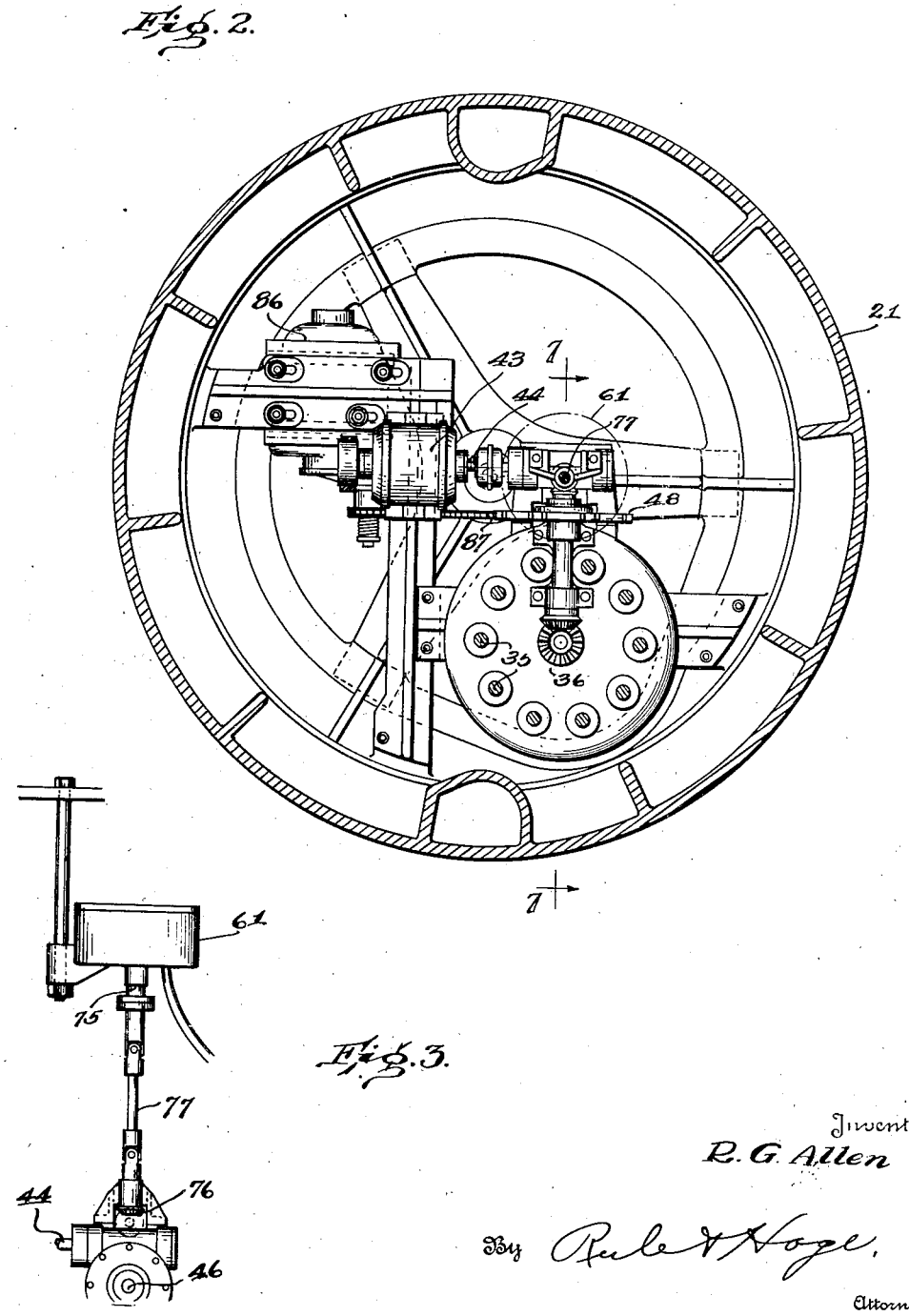
Fig. 2 is a sectional plan view of the cam selecting and adjusting mechanism mounted within the center column of the machine.
Fig. 3 is an elevational view of the electrical distributor.

The cam selecting and adjusting mechanism, for the most part, is mounted within the center column 21 of the machine. Such mechanism includes adjusting units, each comprising a vertical cam driving spindle 35 (Figs. 2 and 7) said spindles being arranged in an annular series concentric with a selector cam shaft 36. The cam shaft is journalled in a gear casing 37 through which the spindles 35 extend and in which they have journalled bearings. The spindles 35 are individual to the various cams and other devices on the blowing machine which are to be selectively operated by the spindles.

Referring to Fig. 1, the spindle 35 which operates the cam 25 has operating connection therewith through a train of gears including intermeshing beveled pinions 38 mounted on the shaft 35 and a horizontal shaft 39. The shaft 39 has driving connection through a worm drive 40, pinion 41, and rack 42, with the cam 25. Similar driving connections (not shown) are provided between the other spindles 35 and the respective cams.

The spindles 35 are selectively driven by a spindle driving motor 86 (Fig. 2) operating through a train of gearing as hereinafter described. Selective mechanism for operatively connecting any selected spindle 35 with its driving motor 86, includes a selector motor 43 (Fig. 2), under the control of the manual selector 60. The shaft 44 of the motor 43 has driving connection through a worm and worm gear 45 (Fig. 7) with a shaft 46. A Geneva drive includes a driving element 47 keyed to the shaft 46 and a Geneva wheel 48 which is keyed to a horizontal shaft 49. Intermeshing bevel gears 50 and 51 are connected to the shafts 49 and 36 respectively. It will be seen that rotation of the motor 43 will impart intermittent step by step rotation to the cam shaft 36. The angle through which the cam shaft is rotated at each step movement is equal to the angular distance between adjacent spindles 35.

The gearing through which the motor 86 operates to drive the spindles 35, includes a train of planetary gears comprising a sun gear 52 rotatable on the shaft 36 and operating through idler gears 53 to drive pinions 54 which are individual to and mounted for rotation on the spindles 35. The gears 54 are selectively connected to the spindles by clutches, each including a clutch member 55 splined on the spindle and movable vertically thereon into and out of driving engagement with the pinion 54. The means for operating the clutches includes a selector cam 56 keyed to the cam shaft 36 and having a cam track 57 on its underside. Bell cranks 58 individual to the spindles 35, each comprises an arm having a roll running on the cam track and an arm engaging the clutch member 55. The cam track 57 is so designed that as the cam rotates, the clutches are operated singly and in succession to effect driving connection between the spindles 35 and their respective gears 54, each clutch being disconnected before the next succeeding clutch is operated.

The operation of the motor 43 is under the control of the manual selector 60 and a distributor 61 connected in the control circuits for the motor 43. Such selector and distributor device are substantially the same as those shown in Patent Number 2,336,830, granted in my name, December 14, 1943, for Selective control mechanism.

The selector 60 (Figs. 4, 11, and 13) comprises a casing including a rotatable knob 64 and a fixed section 62 which is secured to a bracket or support 63 mounted on the machine base or in any convenient position relative to the blowing machine. The knob 64 is rotatable on a stud 65 on an insulating block 66 secured by bolts 67 within the member 62. An annular series of spring-pressed electrical contact blocks 68 are mounted in the insulating block 66 and bear against a contact ring 69 mounted in the knob 64. The ring 69 carries an insulating block or section 70 which, as the ring is rotated, insulates the contacts 68 in succession from the ring 69.

The distributor 61 (Figs. 7, 12, and 13) includes an annular series of switches 71 individual to the cam driving spindles 35, each said switch including a stationary contact 72 (Fig. 13) and a movable contact 73. The distributor includes the cam 74 connected to a shaft 75 which is driven by the selector motor 43. The driving connections include the shaft 49 (Fig. 7) of the Geneva drive, and bevel gears 76 by which the intermittent motion of the shaft 49 is imparted to a drive shaft 77 extending upwardly and connected to the cam shaft 75. The cam 74, when rotated, operates through tappets 78 to move the contacts 73 in succession, into engagement with the contacts 72. Each step movement of the cam operates to close a switch 71 and hold it closed while all the other contacts remain open, each switch, however, being closed just before the preceding switch is opened.

The selector motor 43 (Fig. 13) is driven by current from a power line including the mains 80 and 81. The main 80 is connected to a contact brush 82 which bears on the ring 69. The contacts 68 are connected respectively through wires 83 to the corresponding stationary contacts 72 of the distributor. The movable contacts 73 of the distributor are all connected through a conductor 83ᵃ to one brush of the motor 43, the other brush being connected directly to the main 81.

With the parts in the position as shown in Fig. 13, the motor 43 is at rest as all the switches 71 are open except the uppermost one held closed by the cam 74, and the circuit leading through said closed switch to the main 80, is held open at the insulating section 70. When it is desired to operate one of the cam adjusting spindles 35, the operator rotates the selector knob 60 (Fig. 4) to a position in which a legend 84 corresponding to the selected spindle, is brought opposite a pointer 85. The rotation of the knob 60 moves the insulating patch 70 off the contact 68 which is in circuit with the closed switch 71, thereby establishing a circuit for the motor 43. The motor is thus started and operates through the Geneva drive (Fig. 7) to rotate the distributor cam 74 step by step until it closes the switch 71 corresponding to the selected spindle. As the manual adjustment of the indicator knob has positioned the insulating patch 70 over the contact 68 in circuit with said closed switch, the motor is stopped when the cam 74 reaches a position to close said switch, as all the other switches are then open. The clutch operating cam 56, which is driven in synchronism with the distributor cam, is now in a position in which it holds closed the clutch for the selected spindle 35.

The spindle driving motor 86 may now be operated for rotating the selected spindle. The motor 86 has a driving connection with the selected spindle through a gear train including a sprocket chain 87 (Fig. 2), sprocket wheel 88 (Fig. 7), shaft 89, bevel pinion 90, and a bevel gear 91, the latter secured to a tubular shaft 92 mounted to rotate freely on the shaft 36, the sun gear 52 being fixed to the shaft 92. The operator may start the motor 86 in either direction by depressing one of the push buttons 93 (Fig. 4) in the motor control circuit. The motor then operates through the gear train just described, to rotate the selected cam driving spindle 35, thereby effecting the adjustment of the selected cam. The motor 86 continues to run while the push button 93 is held closed, so that the operator may adjust the cam to any desired extent.

Indicating mechanism, now to be described, including an indicator 95 (Figs. 4 and 5), is provided for indicating the position to which any selected cam is adjusted. Referring to Figs. 7 and 8, the lower end portions of some or all of the spindles 35 extend through openings in a stationary horizontal plate 96 and have secured to their lower ends, worm gears 97. Each said worm gear runs in mesh with a worm wheel 98 on the outer end of a horizontal shaft 99 which is mounted in a bracket 100 on the lower face of the plate 96 and extends inwardly from the spindle toward the axis of the shaft 36. The inner end of each shaft 99 has secured thereto a bevel gear 101 running in mesh with a bevel gear 102 which is internally screw-threaded and runs on a vertical screw-threaded stop rod 103. The latter is free for up-and-down movement in a bearing sleeve 104, but is held against rotation by a pin or lug 105 which enters a vertical slot 106 in the stop rod. It will be seen that rotation of a spindle 35 operates through the gearing, just described, to move the stop rod 103 up or down to a position determined by the extent of rotation of the spindle and therefore to a position corresponding to the position to which the cam has been adjusted.

As shown in Figs. 7, 8, and 10, the cam shaft 36 has attached to its lower end, a shaft or extension 107 which is journalled in a bearing sleeve 108 mounted in the plate 96. Slidable up and down on the sleeve 108, and shaft 107, is a sleeve 109 which has a splined connection 110 with the shaft 107 for rotation therewith. A stop arm 111 formed on said sleeve 109 projects laterally therefrom, and as it is rotated, is brought directly beneath the stop rods 103 in succession, and is arrested in alignment with a stop rod at the completion of each step movement. The sleeve 109 is lifted and lowered by means of a forked arm 112 keyed to a horizontal rock shaft 113 journalled in bearing brackets 114 and 115 on the underside of the plate 96. The shaft 113 is rocked in a direction to lower the stop arm 111 by means of a coil tension spring 116 attached at one end to a rock arm 117 on the shaft and at its other end anchored to a bracket on the plate 96.

Means for rocking the shaft 113 in a direction to lift the stop arm 111, includes an air-operated piston motor 118 comprising a vertically reciprocating piston 119 and piston rod 120. A gear wheel 121, keyed to the shaft 113 is formed with gear teeth which mesh with rack teeth 122 on the piston rod. When the motor piston 119 is lowered, it operates to rotate the shaft 113 in a direction to lift the stop arm 111 into contact with the stop rod 103 in register therewith. Air under pressure for operating the piston motor is supplied through a pipe line 123 under the control of an electromagnetically operated valve 124 (Fig. 7) in said line. The operation of the valve 124 is manually controlled by means of a push button 125 (Fig. 4) in a control circuit for the electromagnet. A needle valve 126 (Fig. 9), is adjustable to control the rate of flow of air to the motor cylinder and thereby control the speed of operation of the motor.

The indicator 95 (Figs. 4 and 5) comprises a dial 127 mounted on a horizontal shaft 128 journalled for rotation in the indicator casing 129 which is mounted on the standard 63. Keyed to the shaft 128 is a bevel pinion 130 driven by a gear 131 keyed to a vertical shaft 132 journalled in the casing. The dial 127 has graduations or scale markings 133 which are visible through a window 134 to indicate the position to which the dial is rotated.

The dial is rotated to a position corresponding to the adjustment of any selected cam, by the rocking movement of the shaft 113, transmitted through driving connections between the shaft and the dial. Such connections include a pinion 135 (Figs. 6, 7, and 9) running in mesh with gear teeth 136 on the gear 121. The pinion is keyed to a shaft 137 journalled in the bracket 115, said shaft being coupled to a flexible shaft 138 which extends through a flexible casing 139 to the indicator and is coupled at its upper end to the shaft 132 (Fig. 5). When the air motor 118 is operated to rotate the shaft 113 and lift the contact arm 111 into engagement with a stop rod 103, motion is imparted through the train of gearing just described and rotates the dial to a position corresponding to the position to which the selected cam has been adjusted. Such position is indicated by the graduations 133 on the dial.

A switch 140 (Figs. 9 and 13) in the main circuit of the motor 43, is normally held closed by a contact piece 141 on the gear 121. When the piston motor 118 is operated, the contact 141 is withdrawn and the switch opened. This prevents operation of the motor 43 while the motor 86 is running and driving the spindles 35.

The operation will be understood from the foregoing description, but may be summarized as follows:

When the operator desires to adjust any particular cam on the blowing machine, he rotates the selector knob 60 to bring the legend 84 (Fig. 4) corresponding to the selected cam, into line with the pointer 85. This establishes a circuit for the motor 43 (Fig. 13) so that the latter is started and rotates the distributor cam 74. The motor circuit is broken and the motor stopped automatically when the cam closes the switch 71 which is in circuit with the particular contact 68 which has been insulated by the segment 70. The motor 43 during this run, operates through the Geneva drive 47, 48 to rotate the selector cam 56 and thereby operates the clutches 55 in succession, so that when the motor is stopped, the clutch for the selected cam driving spindle 35 is in closed position. The operator now presses one of the buttons 93 for starting the motor 86 in either direction, depending on whether it is desired to adjust the cam forward or backward. The motor 86 operates through the planetary gearing 52, 53, and 54 to drive the selected spindle 35, thus adjusting the cam. The extent of adjustment is determined by the length of time the switch button 93 is held closed. The spindle 35 operates to move the associated stop or rod 103 up or down. When the motor 86 is stopped, or while it is still running, the operator pushes the button 125 (Fig. 4) and closes the circuit for the electromagnetic valve 124, thus opening the valve so that the piston motor 118 is operated. The motor 118 lifts the stop arm 111 into contact with the stop rod 103, and at the same time operates the indicator to a position determined by the stop position of the arm 111, thus indicating the position to which the selected cam has been adjusted.

Modifications may be resorted to within the spirit and scope of my invention.

I claim:

1. The combination of a plurality of adjusting units, a stationary support in which said units are individually mounted, a selector device movable to positions individual to said units for selecting said units, means separate from the selector device for operating a selected unit, an indicator, automatic means for operating the indicator to a position determined by the extent of operation of said selected unit, and manual means for bringing the said indicator operating means into activity and effecting its operation after said operation of the selected unit has been completed.

2. The combination of a plurality of adjusting units, a motor, selective means for effecting a driving connection between the motor and a selected unit, an indicator, mechanism for driving the indicator, a stop device movable to operative positions individual to said units, automatic means for moving the stop device to the said operative position individual to the selected unit, and means cooperating with the said stop device to arrest the indicator in a position determined by the extent of movement of said selected unit.

3. The combination of a plurality of adjusting units, a power motor for driving said units, a manual selector device movable to positions individual to said units, means controlled by said selector device and operable automatically to effect a driving connection between said motor and a selected unit for driving the latter, a stop device movable to predetermined positions individual to said units, means operable automatically to move the stop device and bring it to rest at the said position individual to the selected unit, an indicator, mechanism for actuating indicator, and means actuated by said stop device for arresting said mechanism at a position determined by the extent of operation of said selected adjusting unit.

4. The combination of an annular series of adjusting spindles, clutches individual to said spindles, a cam, means providing operating connections between the cam and clutches, a motor, means providing driving connections between the motor and said cam for operating the cam intermittently step by step and thereby operating said clutches in succession, a second motor, gearing driven by said second motor, said clutches being operable to connect the driving spindles singly and in succession to said second motor through said gearing, an indicator, means for driving said indicator, a stop device operatively connected to said first mentioned motor and movable thereby to positions individual to said spindles and brought to each said position as the corresponding spindle is connected by its clutch to said second motor, and means cooperating with said stop device for arresting the indicator in a position determined by the extent to which the selected spindle has been driven.

5. The combination of a vertical shaft, an annular series of adjusting spindles surrounding said shaft, a gear train of interconnected gears including gears individual to said spindles, a motor for driving said gear train, means for rotating said shaft, means operable by said shaft to connect said individual gears singly and in succession to said spindles, permitting the spindles to be rotated by said motor, selective means operable automatically to stop said shaft when a selected spindle is connected for rotation, an indicator, mechanism for driving the indicator, a stop device connected to said shaft and movable thereby to a position corresponding to the position of the selected spindle, and means cooperating with said stop device for arresting the indicator in a position determined by the extent to which the selected spindle has been rotated.

6. The combination of vertical spindles, clutches individual to the spindles, a motor, a clutch operating device rotatable about a vertical axis and operable to connect the clutches in succession to the spindles, and thereby effect driving connections between the motor and the spindles, a stop device connected for rotation with said clutch operating device, an indicator, means for moving said indicator, and means cooperating with said stop device for arresting the indicator in a position determined by extent of rotation of a selected spindle.

7. The combination of vertically disposed adjusting spindles, a motor, a gear train operatively connected to the motor and comprising gears individual to said spindles, a selector cam, means for rotating the cam about a vertical axis, clutches individual to the spindles and operable to connect said gears with their respective spindles for rotating the spindles, means operated by said cam for actuating the clutches singly and in succession, stop rods individual to said spindles, means actuated by the spindles for moving the stop rods to positions corresponding to the extent of rotation of the spindles, a stop device connected to rotate with said cam and thereby be brought into register with said rods in succession, an indicator, an actuator for moving the indicator and stop device, and interconnected mechanism between the said actuator, indicator, and stop device for moving the indicator and the stop device and causing them to be arrested by said stop rod.

8. The combination of vertically disposed adjusting spindles, a motor, a gear train operatively connected to the motor and comprising gears individual to said spindles, a selector cam, means for rotating the cam about a vertical axis, clutches individual to the spindles and operable to connect said gears with their respective spindles for rotating the spindles, means operated by said cam for actuating the clutches singly and in succession, stop rods individual to said spindles, means actuated by the spindles for moving the stop rods to positions corresponding to the extent of rotation of the spindles, a stop device connected to rotate with said cam and thereby be brought into register with said rods in succession, said stop device being movable into and out of contact with the registered stop rod, an indicator, a motor for driving the indicator, and means interconnecting the indicator and the said stop device for causing the indicator to be arrested in a position corresponding to and determined by the position at which the stop device contacts with a stop rod.

9. The combination of an adjusting spindle, means for rotating it, a stop rod mounted separately from said spindle, means providing driving connections between the spindle and stop rod for causing the spindle to move the stop rod as the spindle is rotated, a rock shaft, means for rocking it, a stop device mounted for movement toward and from the stop rod, means providing an operating connection between the rock shaft and said stop device for causing the rock shaft to move said stop device into contact with the stop rod and thereby arrest the rock shaft at a position determined by the position of the stop rod, an indicator, a support on which the indicator is mounted independently of the rock shaft, and means providing operating connections between the rock shaft and the indicator and operative to move the indicator in synchronism with the movement of the rock shaft.

10. The combination of an adjusting spindle, means for rotating the spindle, a screw-threaded stop rod mounted separately from said spindle, gearing providing driving connections between said spindle and rod for rotating the latter as the spindle rotates and thereby adjusting the rod to a position determined by the extent of rotation of the spindle, a rock shaft, means for rocking said shaft, a stop arm, means operated by said rock shaft to move the stop arm into engagement with said stop rod and to thereby arrest the rock shaft in a position determined by the adjusted position of the stop rod, an indicator mounted separately from said rock shaft and spindle, and means actuated by the rock shaft for moving said indicator to a position corresponding to the stop position of the rock shaft.

RUSSELL G. ALLEN.